Aug. 6, 1968   A. BRUNNER   3,396,273
IRRADIATION EQUIPMENT WITH MEANS TO CONVEY GOODS AT A NONUNIFORM
SPEED PAST A RADIATION SOURCE FOR MAXIMUM EXPOSURE
Filed April 9, 1965   3 Sheets-Sheet 1

Inventor:
ALFRED BRUNNER

United States Patent Office 3,396,273
Patented Aug. 6, 1968

3,396,273
IRRADIATION EQUIPMENT WITH MEANS TO CONVEY GOODS AT A NON-UNIFORM SPEED PAST A RADIATION SOURCE FOR MAXIMUM EXPOSURE
Alfred Brunner, Winterthur, Switzerland, assignor to Sulzer Brothers Limited, Winterthur, Switzerland, a corporation of Switzerland
Filed Apr. 9, 1965, Ser. No. 446,977
Claims priority, application Switzerland, Apr. 13, 1964, 4,787/64
4 Claims. (Cl. 250—52)

ABSTRACT OF THE DISCLOSURE

The packages being irradiated are moved about a pair of parallel tracks so that the packages on the inner track shield the packages on the outer track when aligned relative to the radiation source. The movement of the packages is intermittently interrupted to permit exposure of the outer packages for a maximum time during which the outer track packages are unshielded and a minimum time of nonexposure when shielded.

---

This invention pertains to an improvement in irradiation equipment, and more particularly to irradiation equipment in which the material to be irradiated is circulated in equally spaced individual loads past a source of irradiation. In the circulation mechanism to which the instant invention relates, the material to be irradiated is moved in equally spaced containers along a path which comprises at least two parallel tracks disposed one behind the other relative to the source of the irradiation on each side of the source of irradiation.

The purpose of such irradiation equipment in which the material to be irradiated is conveyed along each of two tracks one behind the other is to afford a more effective utilization of the source of irradiation which may, for example, be radioactive cobalt. In this manner, the escaping irradiation, which is not absorbed by the material passing along the tracks closer to the source of irradiation, may still be used to treat the material passing simultaneously along the tracks farther from the source of irradiation.

If the material to be irradiated is conveyed in individual loads in containers and circulated about the source of irradiation on this type of path, it has in the past, nevertheless, been difficult to achieve maximum utilization of the available irradiation. Thus, when the material is conveyed in individual containers, it is often impossible to arrange these containers in such manner that there are no gaps between them; for example, in a vertical circulation system in which the containers are suspended from horizontal bars, a gap must be provided in order to avoid jarring between adjacent containers. In standard circulating irradiation systems of this type in which the movement of the individual containers is at constant speed, there have always arisen relatively large intervals during which at least some of the containers on the inner track are in a position which blocks the containers on the outer track from the source of irradiation, while at the same time, even in the area of maximum intensity of irradiation, some irradiation escapes through the space between two containers on both the inner and the outer track, thus being completely wasted. Even when the movement of the containers has proceeded with interruptions during which the containers remain stationary, it has not previously been possible to assure the avoidance of such an ineffective positioning of the containers. Consequently, maximum use has not been made of the source of irradiation and, for any given required irradiation dose, it has been necessary to use comparatively intense sources in order to compensate for the loss of irradiation, which in turn has increased costs and has generally made the operation of the irradiation equipment more cumbersome.

It is an object of applicant's invention to provide for the circulation of material around the source of irradiation along the type of path described in such manner as to achieve a more effective utilization of the source of irradiation. It is an object of the invention to orient and position the individual containers in the course of movement along the path of circulation around the irradiation source so as to minimize such loss of irradiation and to make it possible to obtain a more effective and rapid irradiating operation with a minimum intensity of the source of irradiation.

According to the invention, the individual containers bearing the material to be irradiated are moved along the path of circulation in such a manner that, with regard to two tracks disposed one behind the other with respect to the irradiation source, the containers on the track farther from the irradiation source simultaneously move into a position in which they are shielded from the irradiation source by the containers on the track closer to the irradiation source, and thereafter simultaneously move into an intermediate position in which the containers on the farther track are opposite the spaces between the containers on the closer track, so as to be fully exposed to the source of irradiation. As the individual containers move forward along the path, the containers on each of the outer tracks are thus alternately in a shielded or in an intermediate exposed position. By maximizing the duration during which the outer track containers are in an intermediate exposed position and by minimizing the duration during which the outer track containers are in a shielded position, maximum use of the source of irradiation will be achieved.

Figure 1:
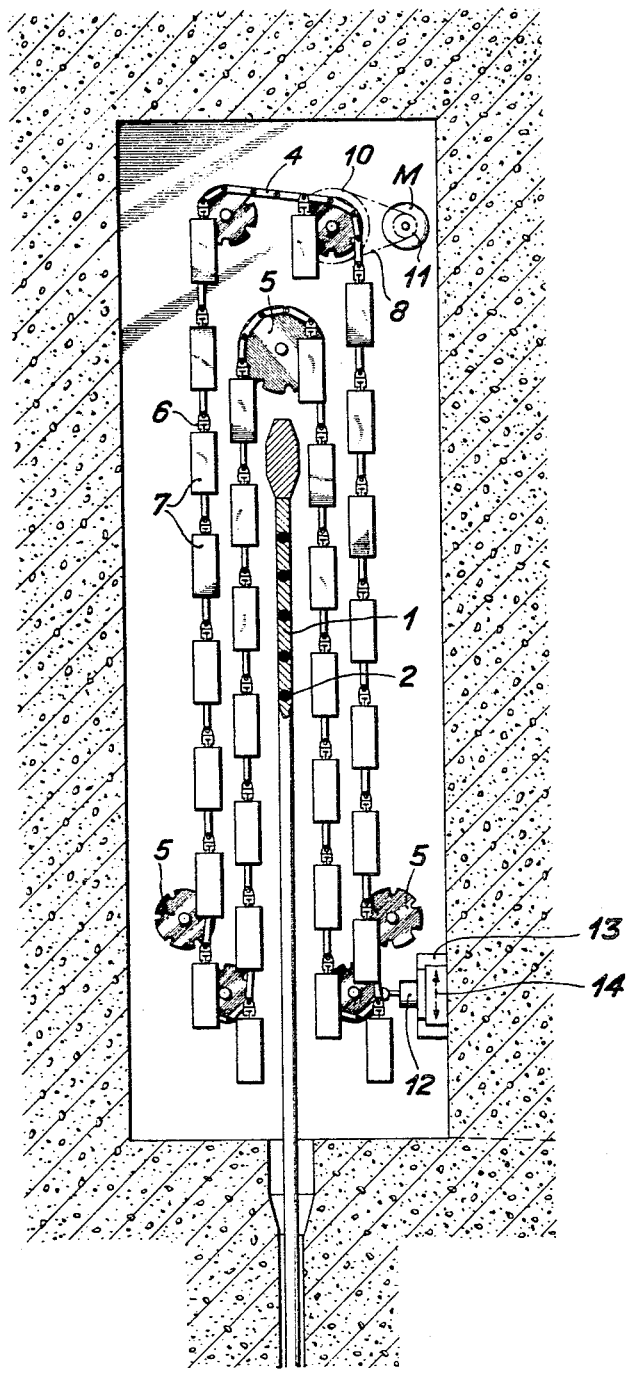
FIGURE 1 shows the embodiment of the invention in a vertical circulation mechanism comprising a chain band oriented in a double-U fashion.

In the arrangement shown in FIGURE 1, the circulation mechanism is arranged around a source of irradiation 1 comprised of individual elements 2 and comprises chains 4 disposed over sprocket wheels 5. At least two parallel chains are provided, connected by cross bars 6. The containers 7, which contain the material to be irradiated, are suspended from the cross bars 6. The chain band is driven by means of an electric motor M through a chain 8 and sprocket wheels 10 and 11. The chain band of the circulation mechanism is oriented in a double-U arrangement, so that there are two tracks parallel to each other and to the source of irradiation on each side of the source of irradiation.

The circulation mechanism shown in FIGURE 1 is designed in such a manner that, during the operation of the circulation mechanism, the containers 7 move simultaneously to a position whereby each container on one track is positioned opposite the space between the containers on the other track on the same side of the source of irradiation. With a further movement of the chain band, the containers 7 move simultaneously to a position in which the containers on the two tracks are positioned behind one another, i.e. each container on the outer track is substantially in the shadow of a container on the inner track, at least in the area of strongest irradiation. This arrangement of the containers 7 in the circulation mechanism in FIGURE 1 is achieved primarily through the orientation of the chain band and of the sprocket wheels and particularly by proper spacing of the containers relative to one another.

Consequently, in accordance with the embodiment of the invention shown in FIGURE 1, the containers in the region of the strongest irradiation are simultaneously positioned in a shielding position, in which the containers of the inner track shield the containers of the outer track, and alternately, in an intermediate position, in which the containers on the outer track are positioned opposite the spaces between the containers on the inner track. In the first or shielding position, there is a minimum utilization of irradiation because the containers of the outer track are positioned in the shadow of the inner track while irradiation escapes unused through the spaces between the containers on both tracks. In the other or intermediate position, there is a maximum utilization of the irradiation because a minimum of irradiation escapes unused.

In accordance with the invention, the speed of the circulation mechanism is varied periodically in such a manner that it is comparatively high in the region of the shielding position of the containers and comparatively slow in the region of the intermediate position of the containers. In this way the containers are positioned in the area of the least satisfactory utilization of irradiation for only a brief period and are positioned in the position of better utilization of the irradiation for a longer period.

The appropriate advance motion can be obtained most readily by imparting to the circulation mechanism a constant speed with periodic interruptions. For this purpose the circulation mechanism of FIGURE 1 is provided with a switch 12 which is positioned upon a structure 13 so as to be adjustable in the direction of the arrow 14. The switch 12 can, for example, be actuated by the cross bars 6 of the chain band or parts fastened thereto so as to periodically stop the forward motion of the circulation mechanism, when a desired intermediate position of maximum irradiation is reached. The exact intermediate position of the containers at the point of interruption can be precisely chosen by adjustment of the switch 12 in the direction of the arrow 14.

Depending upon the extent to which the containers are filled, it may be advantageous to adjust the intermediate position of interruption of motion of the containers in order to alter the distribution of radiation upon the containers. This can be achieved by the aforementioned adjustment of switch 12. After the motion of the containers has been stopped for a predetermined time in the intermediate position, the motor M is switched on again by means of a time relay.

It is further possible to interrupt the circulation mechanism several times while the containers are in the same intermediate region so as to provide a number of extended exposures to irradiation through interruptions of the motion of the containers in the same intermediate region. The resulting positions are advantageously preselected, symmetrically both in time and in distance, about an optimum intermediate position. Such an arrangement is shown in the diagrams of FIGURES 2 and 3.

Figure 2:
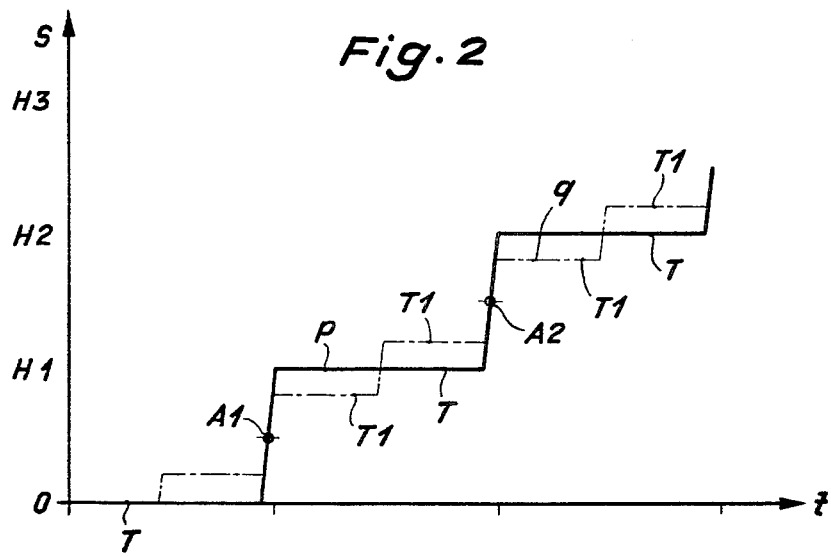
FIGURES 2 and 3 show diagrammatic representations of the invention.

FIGURE 2 is a diagrammatic representation of the forward motion of the circulation system between individual stationary positions of interruption of motion as plotted against time. The individual stationary positions are designated $H_1$, $H_2$ etc. The corresponding shielding positions are designated $A_1$, $A_2$. During forward motion in accordance with solid line $p$, a stationary position for the duration for a time $T$ is provided, followed by a short period of forward motion. During forward motion in accordance with dash-dot line $q$, two equally long periods of interruption of motion, each for a duration of time $T_1$, are provided wherein the positions are symmetric to the intermediate positions $H_1$, $H_2$. During forward motion as illustrated by line $q$, the spacing of the stationary positions within the intermediate region can be varied and a plurality of positions of interruption of motion, preferably symmetrically distributed, can be provided.

Figure 3:
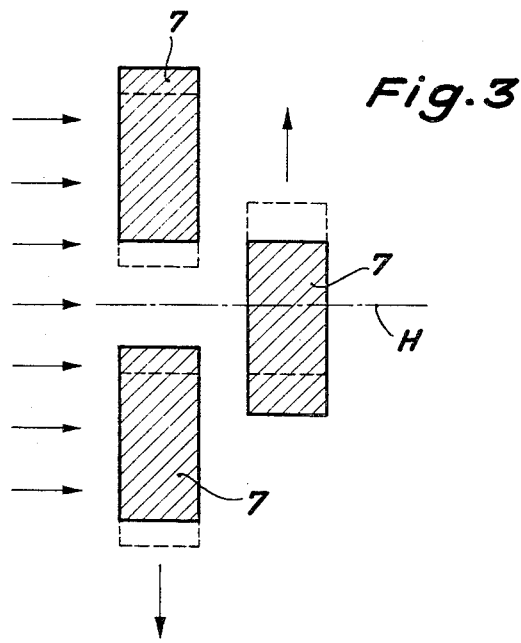

FIGURE 3 illustrates forward motion in accordance with line $q$. The solid line and dotted line show the two positions of the containers 7. It can be seen that these positions are symmetrical with respect to an optimum intermediate position H. In this manner it is possible to obtain an even distribution of the irradiation doses upon the individual containers, or generally to adjust the distribution of the doses of irradiation.

Figure 4:
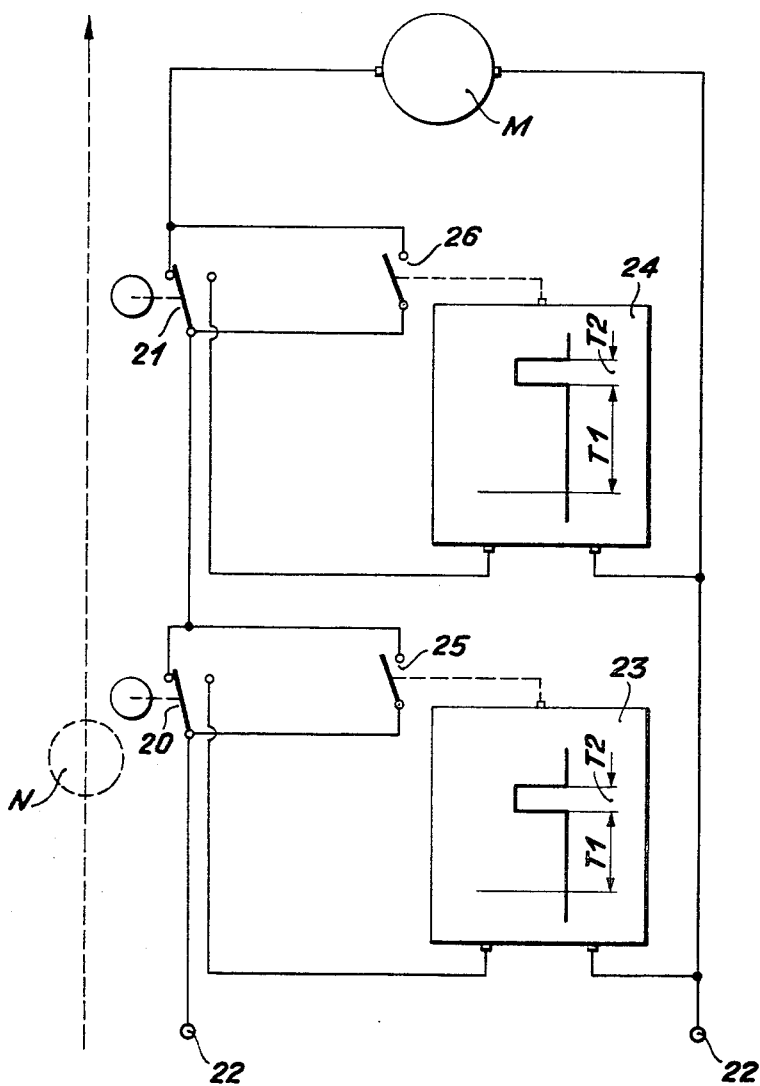
FIGURE 4 shows an electrical circuit diagram for the drive mechanism.

FIGURE 4 illustrates an electric circuit diagram for obtaining forward motion in accordance with dash-dotted line $q$ of FIGURE 2 or FI1URE 3. In this particular embodiment, two switches 20 and 21, rather than one switch 12, are included in the circulation mechanism of FIGURE 1. These switches are sequentially actuated by a cam N, which, as previously mentioned, can be positioned at a cross bar 6. Switches 20 and 21 are connected in series and, in position $y$, allow current flow from source 22 to motor M. When either switch is transferred to its open position $x$ by cam N, the current supply to motor M from source 22 is interrupted. When swich 20 or 21 is moved to position $x$, the circuit of time relay 23 or 24, respectively, is closed. This activates time relay source 23 or 24 which, after time delay $T_1$, causes contact 25 or 26, respectively, to be closed. Since contacts 25 or 26 are connected in parallel with contacts 20 and 21, respectively, closure of 25 or 26 permits the current to flow around contacts 20 and 21 to motor M, causing motor M to start again. Consequently the forward motion of the circulation system is resumed until the cam N reaches the contact 21 or alternately, until the cam N of the next cross bar reaches the switch 20. The number and the location of the switches can be varied in accordance with the number and location of positions of interruption of motion sought. Similarly, the exposure time $T_1$ can be varied by adjustment of the time relay 23 or 24. The time period $T_2$ during which the switches 25 or 26 are closed need be only so long to assure that, by the time the switches 25 or 26 are reopened, the cam N will have already passed by the switches 20 or 21 so as to permit them to be reset.

What is claimed is:

1. Irradiation equipment comprising a source of radiation, a multiplicity of containers for bearing the material to be irradiated, means for circulating said containers about said radiation source whereby said containers are moved along a path comprising at least two parallel tracks disposed one behind the other relative to said radiation source on each side of said radiation source, and whereby further the containers on a track farther from the source of radiation are moved alternately into a position in which they are shielded from said radiation source by the containers on a track nearer the radiation source and into a position in which they are opposite the spaces between the containers on the track nearer the radiation source, and means for regulating the speed of movement of said containers along said path whereby, in the areas of strongest irradiation, the duration in which the containers on a track farther from the radiation source are shielded from the radiation source by the containers on the nearer track is minimal, and the duration during which the containers on a track farther from the radiation source are located opposite the spaces between containers on the nearer track is maximal.

2. Irradiation equipment comprising a source of radiation, a multiplicity of containers for bearing the material to be irradiated, means for circulating said containers about said radiation source whereby said containers are moved along a path comprising at least two parallel tracks disposed one behind the other relative to said radiation source on each side of said radiation source, and whereby further the containers on a track farther from the source of radiation are moved alternately into a position in which they are shielded from said radiation source by the containers on a track nearer the radiation source and into a position in which they are opposite the spaces between the containers on the track nearer the radiation source, and means for interrupting the movement of the containers at least once in each position in which the containers on a track farther from the source of radiation are located opposite the spaces between the containers on the track nearer the radiation source, whereby the duration during which the containers on the track farther from the radiation source are exposed to the radiation source is considerably greater than the duration during which the containers on the track farther from the radiation source are shielded from the radiation source by the containers on the nearer track.

3. Irradiation equipment comprising a source of radiation, a multiplicity of containers for bearing the material to be irradiated, means for circulating said containers about said radiation source at a constant speed whereby said containers are moved along a path comprising at least two parallel tracks disposed one behind the other relative to said radiation source on each side of said radiation source, and whereby further the containers on a track farther from the source of radiation are moved alternately into a position in which they are shielded from said radiation source by the containers on a track nearer the radiation source and into a position in which they are opposite the spaces between the containers on the track nearer the radiation source, and means for interrupting the movement of the containers along the path at least once in each position in which the containers on a track farther from the source of radiation are located opposite the spaces between the containers on the track nearer the radiation source, whereby the duration during which the containers on the track farther from the radiation source are exposed to the radiation source is considerably greater than the duration during which the containers on the track farther from the radiation source are shielded from the radiation source by the containers on the nearer track.

4. Irradiation equipment comprising a source of radiation, a multiplicity of containers for bearing the material to be irradiated, means for circulating said containers about said radiation source whereby said containers are moved along a path comprising at least two parallel tracks disposed one behind the other relative to said radiation source on each side of said radiation source, and whereby further the containers on a track farther from the source of radiation are moved alternately into a position in which they are shielded from said radiation source by the containers on a track nearer the radiation source and into a position in which they are opposite the space between the containers on the track nearer the radiation source, means for interrupting the movement of the containers along the path a plurality of times within each interval in which the containers on a track farther from the source of radiation are located opposite the spaces between the containers on the track nearer the radiation source, the positions of said interruptions being symmetrical with regard to time and with regard to distance within each such interval, whereby the duration during which the containers on the track farther from the radiation source are exposed to the radiation source is considerably greater than the duration during which the containers on the track farther from the radiation source are shielded from the radiation source by the containers on the nearer track, and the intensity of irradiation is uniform throughout the volume of each container.

References Cited
UNITED STATES PATENTS 3,192,054   6/1965   Kuhl et al. _____ 250—52 X
3,224,562   12/1965   Bailey et al. _____ 198—131

WILLIAM F. LINDQUIST, *Primary Examiner.*